(12) United States Patent
Moriya et al.

(10) Patent No.: US 11,173,793 B2
(45) Date of Patent: Nov. 16, 2021

(54) ELECTRIC POWER SUPPLY SYSTEM INCLUDING BATTERY, SWITCHING APPARATUS AND CONTROL APPARATUS

(71) Applicant: SUBARU CORPORATION, Tokyo (JP)

(72) Inventors: Fumiyuki Moriya, Tokyo (JP); Daisuke Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/738,858

(22) Filed: Jan. 9, 2020

(65) Prior Publication Data

US 2020/0313458 A1 Oct. 1, 2020

(30) Foreign Application Priority Data

Mar. 27, 2019 (JP) .............................. JP2019-059596

(51) Int. Cl.
*B60L 53/10* (2019.01)
*B60L 53/00* (2019.01)
*H02J 9/06* (2006.01)
*H02J 7/00* (2006.01)

(52) U.S. Cl.
CPC .............. *B60L 53/00* (2019.02); *B60L 53/10* (2019.02); *H02J 7/0016* (2013.01); *H02J 7/0019* (2013.01); *H02J 7/0024* (2013.01); *H02J 9/062* (2013.01)

(58) Field of Classification Search
CPC .................................. B60L 53/00; B60L 53/10

USPC ........................................................... 307/9.1
See application file for complete search history.

(56) References Cited

U.S. PATENT DOCUMENTS

| | | | |
|---|---|---|---|
| 10,994,622 B2* | 5/2021 | Hori ...................... | B60L 3/0046 |
| 2013/0221921 A1* | 8/2013 | Ang ......................... | B60L 7/14 |
| | | | 320/109 |
| 2013/0226389 A1* | 8/2013 | Yamazaki ............. | B60W 10/26 |
| | | | 701/22 |
| 2015/0212135 A1* | 7/2015 | Jin .......................... | B60L 53/18 |
| | | | 324/538 |
| 2018/0170203 A1* | 6/2018 | Jang .................... | B60L 11/1838 |

(Continued)

FOREIGN PATENT DOCUMENTS

JP 2011-199920 A 10/2011

*Primary Examiner* — Adi Amrany
(74) *Attorney, Agent, or Firm* — McGinn IP Law Group, PLLC

(57) ABSTRACT

An electric power supply system includes a battery, an electric power receiving apparatus, a switching apparatus, and a control apparatus. The electric power receiving apparatus is coupled to the battery in parallel with a load, and receives and supplies external electric power to the battery. In a load driving mode, the control apparatus sets an electrical connection state of the electric power supply system to a first connection state in which connection of the electric power receiving apparatus and the load to the battery is cut off by the switching apparatus and controls a voltage of the electric power receiving apparatus depending on a voltage of the battery if output electric power of the electric power receiving apparatus is equal to or less than reference electric power, and otherwise sets the electrical connection state to a second connection state in which the connection is allowed by the switching apparatus.

22 Claims, 10 Drawing Sheets

(56) References Cited

U.S. PATENT DOCUMENTS

2018/0312074 A1* 11/2018 Tsutsumi .............. B60L 3/0046
2018/0345798 A1* 12/2018 Sakakibara ............... B60L 1/02

* cited by examiner

ELECTRIC POWER SUPPLY SYSTEM INCLUDING BATTERY, SWITCHING APPARATUS AND CONTROL APPARATUS

CROSS-REFERENCE TO RELATED APPLICATIONS

The present application claims priority from Japanese Patent Application No. 2019-059596 filed on Mar. 27, 2019, the entire contents of which are hereby incorporated by reference.

BACKGROUND

The technology relates to an electric power supply system.

An electrically driven vehicle, such as an electric vehicle (EV) or a hybrid electric vehicle (HEV), is generally provided with a battery configured to store electric power to be supplied to a driving motor. In some electrically driven vehicles, the battery is chargeable with use of an external electric power source. Japanese Unexamined Patent Application Publication No. 2011-199920 discloses a technique related to an electric vehicle. The technique receives external electric power transmitted from an external electric power source, and supplies the external electric power to a battery to charge the battery.

SUMMARY

An aspect of the technology provides an electric power supply system including a battery, an electric power receiving apparatus, a switching apparatus, and a control apparatus. The electric power receiving apparatus is coupled to the battery in parallel with a load, and is configured to receive external electric power and supply the external electric power to the battery. The switching apparatus is configured to allow or cut off connection of the electric power receiving apparatus and the load to the battery. The control apparatus is configured to permit a load driving mode of driving the load and control the switching apparatus in a case where the electric power receiving apparatus is able to receive the external electric power. The control apparatus is configured to, in the load driving mode, set an electrical connection state of the electric power supply system to a first connection state in which the connection of the electric power receiving apparatus and the load to the battery is cut off by the switching apparatus, and control a voltage of the electric power receiving apparatus depending on a voltage of the battery, if output electric power of the electric power receiving apparatus is equal to or less than reference electric power, and set the electrical connection state of the electric power supply system to a second connection state in which the electric power receiving apparatus and the load are coupled to the battery via the switching apparatus, if the output electric power of the electric power receiving apparatus is greater than the reference electric power.

An aspect of the technology provides an electric power supply system including a battery, an electric power receiving apparatus, a switching apparatus, and a control apparatus. The electric power receiving apparatus is coupled to the battery in parallel with a load, and is configured to receive external electric power and supply the external electric power to the battery. The switching apparatus is configured to allow or cut off connection of the electric power receiving apparatus and the load to the battery. The control apparatus is configured to permit a load driving mode of driving the load and control the switching apparatus in a case where the electric power receiving apparatus is able to receive the external electric power. The control apparatus is configured to, while output electric power of the electric power receiving apparatus increases in the load driving mode, set an electrical connection state of the electric power supply system to a first connection state in which connection of the electric power receiving apparatus and the load to the battery is cut off by the switching apparatus, and thereafter to a second connection state in which the electric power receiving apparatus and the load are coupled to the battery via the switching apparatus.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
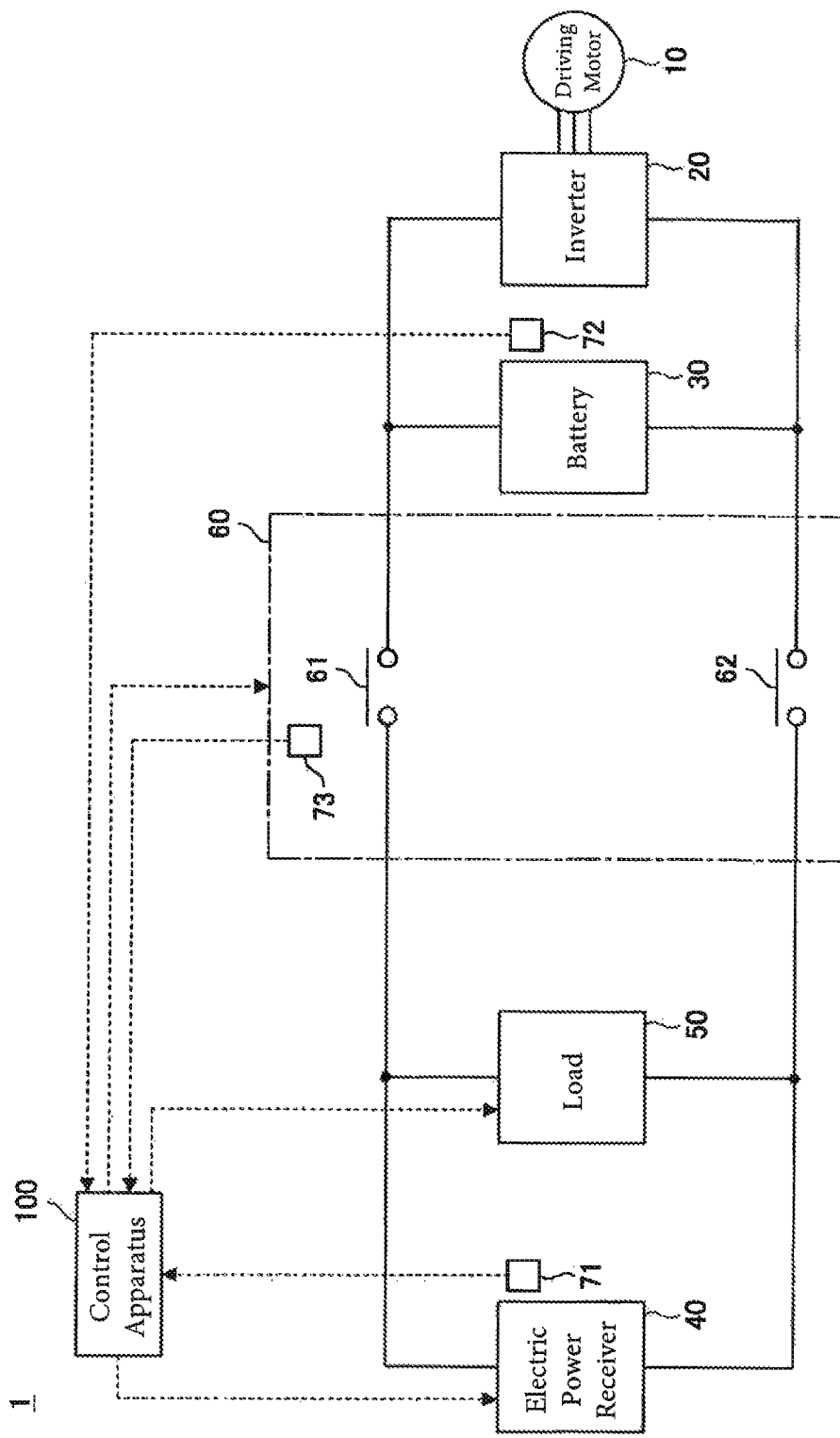
FIG. 1 is a schematic diagram illustrating an outline configuration of an electric power supply system according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

1. Configuration of Electric Power Supply System

Figure 2:
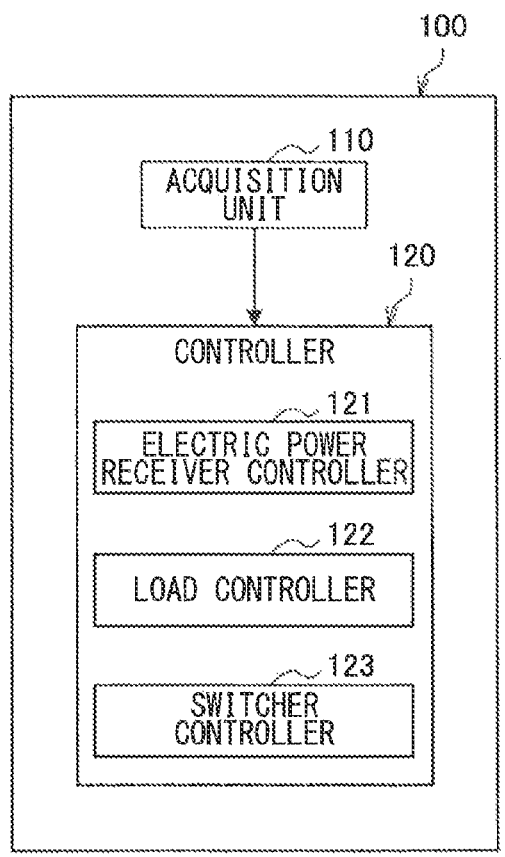
FIG. 2 is a block diagram illustrating an example of a configuration of a control apparatus according to the example embodiment.

With reference to FIGS. 1 and 2, description will be given on a configuration of an electric power supply system 1 according to one example embodiment of the technology. In one embodiment, the electric power supply system 1 may serve as an "electric power supply system".

FIG. 1 is a schematic diagram illustrating an outline configuration of the electric power supply system 1.

In one example, the electric power supply system 1 may be mounted on an electrically driven vehicle, such as an electric vehicle (EV) or a hybrid electric vehicle (HEV), and may be used to supply electric power to each apparatus in the vehicle. It is to be noted that the electrically driven vehicle may be any vehicle that includes a driving motor as a driving source and is caused to travel by torque of the driving motor, and examples may include a railway vehicle as well as an automobile.

As illustrated in FIG. 1, the electric power supply system 1 may include a driving motor 10, an inverter 20, a battery 30, an electric power receiver 40, a load 50, a switcher 60, an electric power receiver sensor 71, a battery sensor 72, a switcher temperature sensor 73, and a control apparatus 100. The vehicle equipped with the electric power supply system 1 may travel by using the driving motor 10 as a driving source. In one embodiment, the battery 30 may serve as a "battery". In one embodiment, the electric power receiver 40 may serve as an "electric power receiving apparatus". In one embodiment, the switcher 60 may serve as a "switching apparatus". In one embodiment, the control apparatus 100 may serve as a "control apparatus". In one embodiment, the load 50 may serve as a "load".

The driving motor 10 may be a motor that outputs motive power to be transmitted to a driving wheel, and may be, in one example, a polyphase alternating current (e.g., three-phase alternating current) motor. The driving motor 10 may be coupled to the battery 30 via the inverter 20, and may generate the motive power by using electric power supplied from the battery 30 via the inverter 20. The driving motor 10 may also serve as an electric power generator that regeneratively generates electric power by using rotational energy of the driving wheel when the vehicle decelerates.

The inverter 20 may be an electric power converter that is able to bidirectionally execute conversion between direct-current electric power and alternating-current electric power, and may include, in one example, a polyphase bridge circuit. The inverter 20 may be configured to convert direct-current electric power supplied from the battery 30 into alternating-current electric power, and supply the alternating-current electric power to the driving motor 10. The inverter 20 may also be configured to convert alternating-current electric power regeneratively generated by the driving motor 10 into direct-current electric power, and supply the direct-current electric power to the battery 30. The inverter 20 may be provided with a switching device, and the electric power conversion by the inverter 20 may be controlled by controlling operation of the switching device.

The battery 30 may be configured to store electric power to be supplied to the driving motor 10. As the battery 30, for example, a secondary battery may be used, such as a lithium ion battery, a lithium-ion polymer battery, a nickel-metal hydride battery, a nickel-cadmium battery, or a lead-acid battery.

The electric power receiver 40 is coupled to the battery 30, and is able to receive external electric power transmitted from an external electric power source (i.e., an electric power source outside the vehicle equipped with the electric power supply system 1). Because the electric power supply system 1 is thus provided with the electric power receiver 40, it is possible to charge the battery 30 with the external electric power supplied from the external electric power source via the electric power receiver 40.

In one example, the electric power receiver 40 may be able to receive electric power transmitted from the external electric power source in a state of being physically coupled to the external electric power source. For example, the electric power receiver 40 may be provided with a transformer that is able to convert voltage. The transformer makes it possible to convert a voltage of the external electric power transmitted from the external electric power source. The electric power receiver 40 may also be provided with an electric power converter that is able to convert alternating-current electric power into direct-current electric power. The electric power converter makes it possible to, in a case where the external electric power source is an alternating-current electric power source, convert alternating-current external electric power transmitted from the external electric power source into direct-current electric power.

In another example, the electric power receiver 40 may be able to receive, in a noncontact manner, the external electric power transmitted from the external electric power source. In that case, for example, the electric power receiver 40 may be provided with an electric power receiving coil that is able to receive alternating-current external electric power transmitted from an electric power transmitting coil of the external electric power source, and an electric power converter that is able to convert the external electric power into direct-current electric power. As a method of transmitting electric power from the electric power transmitting coil to the electric power receiving coil, a magnetic resonance method or an electromagnetic induction method may be used, for example.

The load 50 may be coupled to the battery 30 in parallel with the electric power receiver 40. For example, an apparatus such as an air-conditioning apparatus or a car navigation apparatus may correspond to an example of the load 50.

The switcher 60 is configured to allow or cut off electrical connection of the electric power receiver 40 and the load 50 to the battery 30. The switcher 60 may be provided between the battery 30, and the electric power receiver 40 and the load 50.

In one example, as illustrated in FIG. 1, the switcher 60 may include a positive electrode-side relay 61 coupled to a positive electrode side of the battery 30 and a negative electrode-side relay 62 coupled to a negative electrode side of the battery 30.

The electric power receiver sensor 71 may detect electrical quantities of state of the electric power receiver 40, and output the detected electrical quantities of state to the control apparatus 100. In one example, the electric power receiver sensor 71 may detect voltage and current of the electric power receiver 40, as the electrical quantities of state of the electric power receiver 40.

The battery sensor 72 may detect quantities of state of the battery 30, and output the detected quantities of state to the control apparatus 100. In one example, the battery sensor 72 may detect, as the quantities of state of the battery 30, a voltage of the battery 30, a remaining capacity (state of charge or SOC) of the battery 30, and a temperature of the battery 30. It is to be noted that the battery sensor 72 may detect another physical quantity that is substantially convertible into the temperature of the battery 30.

The switcher temperature sensor 73 may detect a temperature of the switcher 60 and an electric power line coupled to the switcher 60. It is to be noted that the switcher temperature sensor 73 may detect another physical quantity that is substantially convertible into the temperature of the switcher 60 and the electric power line coupled to the switcher 60.

The control apparatus 100 may include a central processing unit (CPU), a read only memory (ROM), and a random access memory (RAM), for example. The CPU may be an arithmetic processing unit. The ROM may be a storage device that stores information such as programs and operation parameters to be used by the CPU. The RAM may be a storage device that temporarily stores parameters, for example, that change as appropriate in execution of the CPU.

The control apparatus 100 may communicate with each apparatus mounted on the electric power supply system 1. The control apparatus 100 may communicate with each apparatus by, for example, controller area network (CAN) communication.

It is to be noted that operations of the control apparatus 100 according to the example embodiment may at least partially be shared by a plurality of control apparatuses, or a plurality of operations may be implemented by one control apparatus. In a case where the operations of the control apparatus 100 are at least partially shared by a plurality of control apparatuses, the plurality of control apparatuses may be coupled to each other via a communication bus of CAN, for example.

For example, the control apparatus 100 may include an acquisition unit 110 and a controller 120, as illustrated in FIG. 2.

The acquisition unit 110 may acquire various kinds of information to be used in a process performed by the controller 120, and output the acquired information to the controller 120. For example, the acquisition unit 110 may communicate with the electric power receiver sensor 71, the battery sensor 72, and the switcher temperature sensor 73 to acquire various kinds of information outputted from the respective sensors.

The controller 120 may control operation of each apparatus of the electric power supply system 1. For example, the controller 120 may include an electric power receiver controller 121, a load controller 122, and a switcher controller 123.

The electric power receiver controller 121 may control operation of the electric power receiver 40. For example, the electric power receiver controller 121 may control a voltage of the electric power receiver 40, by controlling supply of external electric power to the electric power supply system 1 by the electric power receiver 40. In one example, in a case where the electric power receiver 40 is provided with an electric power converter that is able to convert alternating-current electric power into direct-current electric power, it is possible for the electric power receiver controller 121 to control the external electric power supplied via the electric power receiver 40, by controlling operation of the electric power converter. In another example, the electric power receiver controller 121 may control the external electric power supplied via the electric power receiver 40, by outputting a control command to the external electric power source.

The load controller 122 may control operation of the load 50. In one example, the load controller 122 may drive or stop the load 50, by controlling electric power supply to the load 50. For example, it is possible for the load controller 122 to control the electric power supply to the load 50, by controlling operation of a switch (not illustrated), for example, that is able to adjust electric power supplied to the load 50.

The switcher controller 123 may control operation of the switcher 60. In one example, the switcher controller 123 may control an electrical connection state of the electric power supply system 1, by controlling an open/closed state of each relay of the switcher 60.

Here, in a state in which the electric power receiver 40 is able to receive power, the controller 120 is able to execute a load driving mode of permitting driving of the load 50. For example, the vehicle equipped with the electric power supply system 1 may be provided with an input apparatus, such as a button, directed to selecting execution or stop of the load driving mode. It is possible for the driver to select execution or stop of the load driving mode by operating the input apparatus. In a case where execution of the load driving mode is selected by the driver, the controller 120 may execute the load driving mode.

In the load driving mode, for example, it is possible to drive the load 50 by using the external electric power supplied via the electric power receiver 40. However, in the load driving mode, electric power stored in the battery 30 may be used to drive the load 50 in some cases. When the battery 30 is thus discharged, the remaining capacity of the battery 30 decreases, in which case charging of the battery 30 may be performed. Therefore, in existing techniques, repetition of charging and discharging of the battery 30 in the load driving mode can promote deterioration of the battery 30.

In the electric power supply system 1 according to the example embodiment, in the load driving mode, while it is determined that output electric power of the electric power receiver 40 is equal to or less than reference electric power, the controller 120 may set the electrical connection state of the electric power supply system 1 to a first connection state in which the electric power receiver 40 and the load 50 are electrically cut off from the battery 30 by the switcher 60, and thereafter may control the voltage of the electric power receiver 40 within a reference range corresponding to the voltage of the battery 30. If it is determined that the output electric power of the electric power receiver 40 is greater than the reference electric power, the controller 120 may set the electrical connection state of the electric power supply system 1 to a second connection state in which the electric power receiver 40 and the load 50 are electrically coupled to the battery 30 via the switcher 60. This makes it possible to appropriately suppress deterioration of the battery 30. A process related to such control of the electrical connection state of the electric power supply system 1 during the execution of the load driving mode by the controller 120 will be described in detail later.

2. Operation of Electric Power Supply System

Now, with reference to FIGS. 3 to 10, description will be given on operation of the electric power supply system 1 according to the example embodiment of the technology.

The following description describes, as examples of a flow of a process that is performed by the control apparatus 100, a first example, a second example, and a third example in this order.

2-1. First Example

First, with reference to FIGS. 3 to 7, description will be given on the first example of the flow of the process performed by the control apparatus 100.

Figure 3:
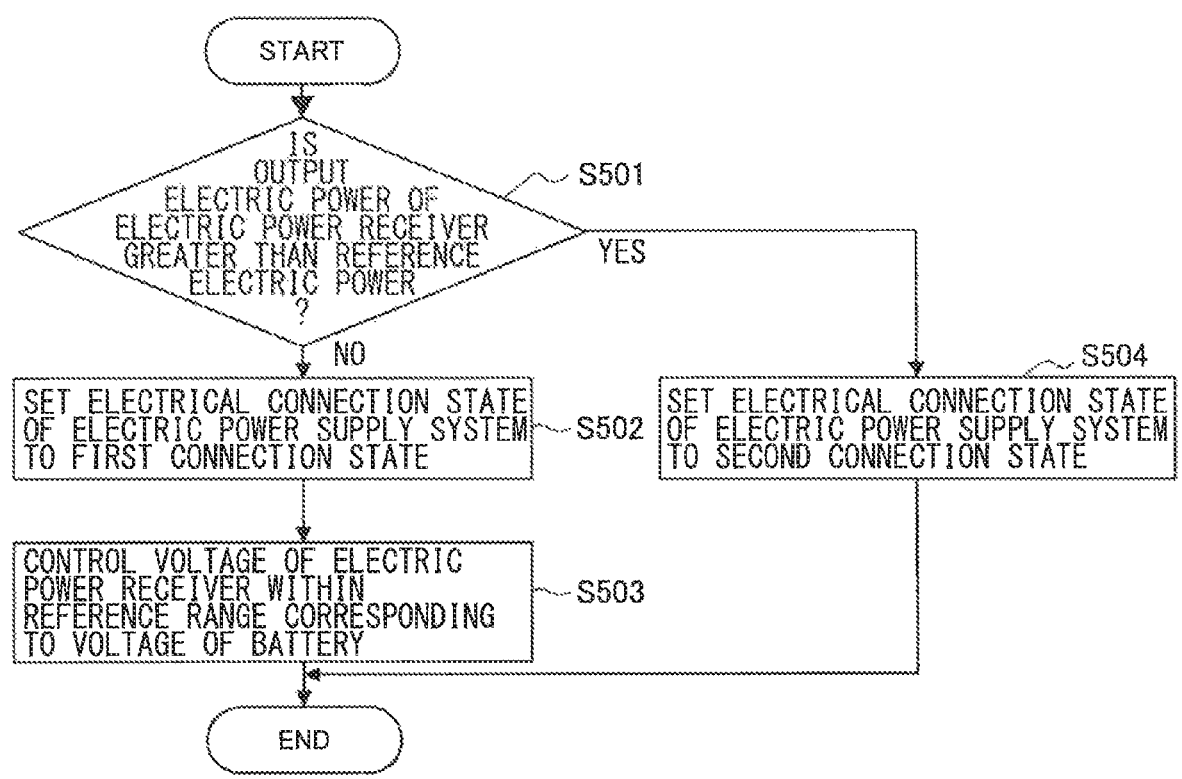
FIG. 3 is a flowchart illustrating a first example of a flow of a process that is performed by the control apparatus according to the example embodiment.

FIG. 3 is a flowchart illustrating the first example of the flow of the process performed by the control apparatus 100. In one example, the control flow illustrated in FIG. 3 may be repeatedly executed by the controller 120 during the execution of the load driving mode.

When the control flow illustrated in FIG. 3 is started, first, in step S501, the controller 120 may determine whether the output electric power of the electric power receiver 40 is greater than the reference electric power. If it is determined that the output electric power of the electric power receiver 40 is equal to or less than the reference electric power (step S501/NO), the control flow may proceed to step S502. If it is determined that the output electric power of the electric power receiver 40 is greater than the reference electric power (step S501/YES), the control flow may proceed to step S504.

The output electric power of the electric power receiver 40 may be electric power outputted by the electric power receiver 40. It is possible for the controller 120 to calculate the output electric power of the electric power receiver 40 on the basis of, for example, the voltage and the current of the electric power receiver 40 detected by the electric power receiver sensor 71.

In one example, the reference electric power may correspond to an upper limit of a range of electric power that is allowed to be continuously outputted from the electric power receiver 40.

It is to be noted that, in step S501, the controller 120 may determine YES in a case where the output electric power of the electric power receiver 40 actually exceeds the reference electric power. Alternatively, the controller 120 may determine YES in a case where the output electric power of the electric power receiver 40 is predicted to exceed the reference electric power. For example, the controller 120 is able to predict that the output electric power of the electric power receiver 40 exceeds the reference electric power, on the basis of a history of the output electric power of the electric power receiver 40 or transition of electric power consumed by the load 50.

If the determination result is NO in step S501, in step S502, the controller 120 may set the electrical connection state of the electric power supply system 1 to the first connection state.

Figure 4:
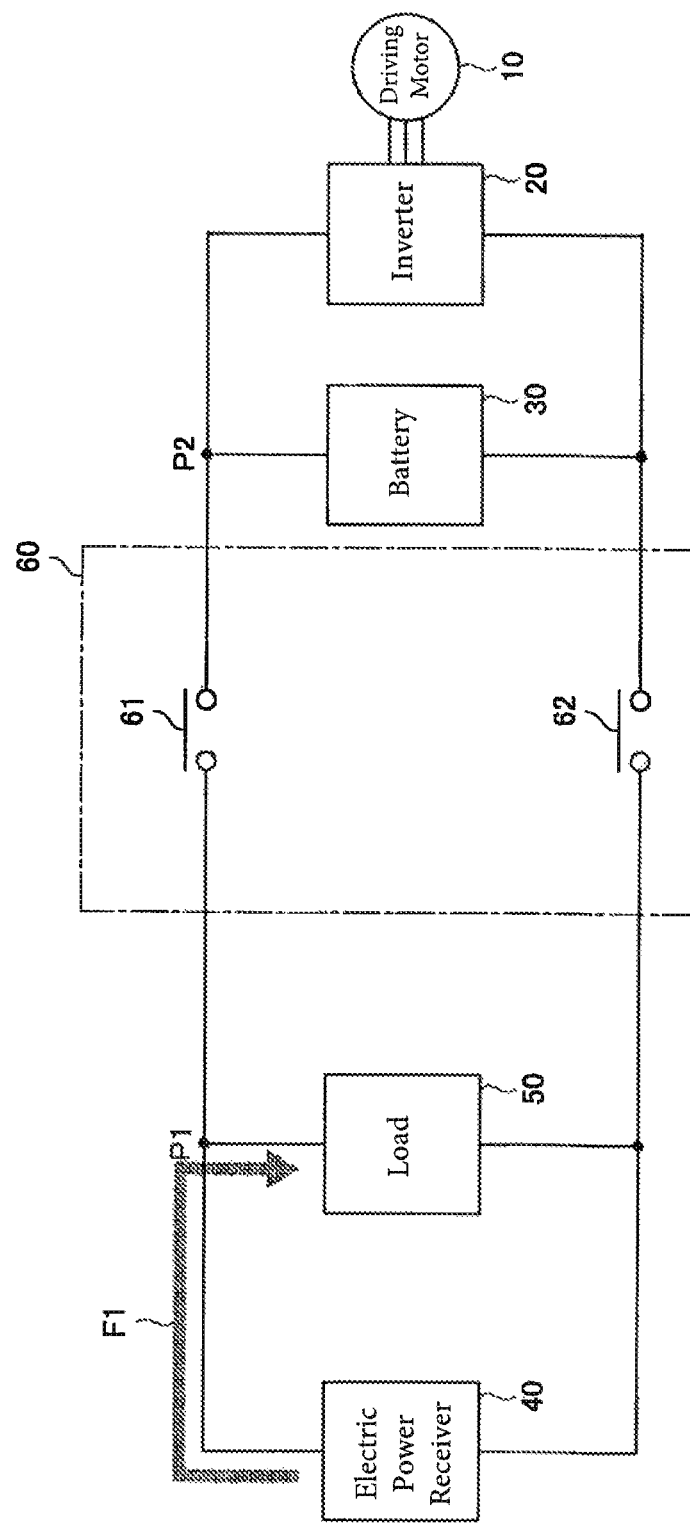
FIG. 4 is a diagram illustrating a first connection state out of electrical connection states of the electric power supply system according to the example embodiment.

The first connection state will be described with reference to FIG. 4. FIG. 4 is a diagram illustrating the first connection state out of the electrical connection states of the electric power supply system 1. For easier understanding, FIG. 4 does not illustrate the sensors and the control apparatus 100.

As illustrated in FIG. 4, the first connection state may be a connection state in which the electric power receiver 40 and the load 50 are electrically cut off from the battery 30 by the switcher 60. In one example, in the first connection state, the open/closed states of the positive electrode-side relay 61 and the negative electrode-side relay 62 may both be the open state.

In the first connection state, as indicated by arrow F1 in FIG. 4, electric power may be supplied from the electric power receiver 40 to the load 50. In the first connection state, because the electric power receiver 40 and the load 50 are electrically cut off from the battery 30 by the switcher 60, no electric power supply may occur between the load 50 and the battery 30. This makes it possible to suppress input and output currents of the battery 30, making it possible to suppress deterioration of the battery 30 due to repetition of charging and discharging of the battery 30.

Thereafter, in step S503, the controller 120 may control the voltage of the electric power receiver 40 within the reference range corresponding to the voltage of the battery 30.

In one example, the voltage of the electric power receiver 40 may be controlled by deciding the reference range to suppress an excessive increase in a difference between a voltage on the load 50 side with respect to the switcher 60 (e.g., a voltage at point P1 in FIG. 4) and a voltage on the battery 30 side with respect to the switcher 60 (e.g., a voltage at point P2 in FIG. 4). Suppressing an excessive increase in voltage difference between the load 50 side and the battery 30 side with respect to the switcher 60 makes it possible to suppress damage to each apparatus when the electric power receiver 40 and the load 50 are coupled to the battery 30 to allow for electric power supply via the switcher 60 (e.g., when each relay of the switcher 60 is closed) by the electrical connection state of the electric power supply system 1 being set to the second connection state (described later).

For example, in terms of appropriately suppressing damage to the switcher 60 and the electric power line coupled to the switcher 60 (hereinafter, also referred to as the switcher 60 etc.), the controller 120 may decide the reference range on the basis of a withstand voltage of the switcher 60 etc., as will be described later. In terms of appropriately suppressing damage to the battery 30, the controller 120 may decide the reference range on the basis of maximum chargeable and dischargeable electric power of the battery 30, as will be described later.

Figure 5:
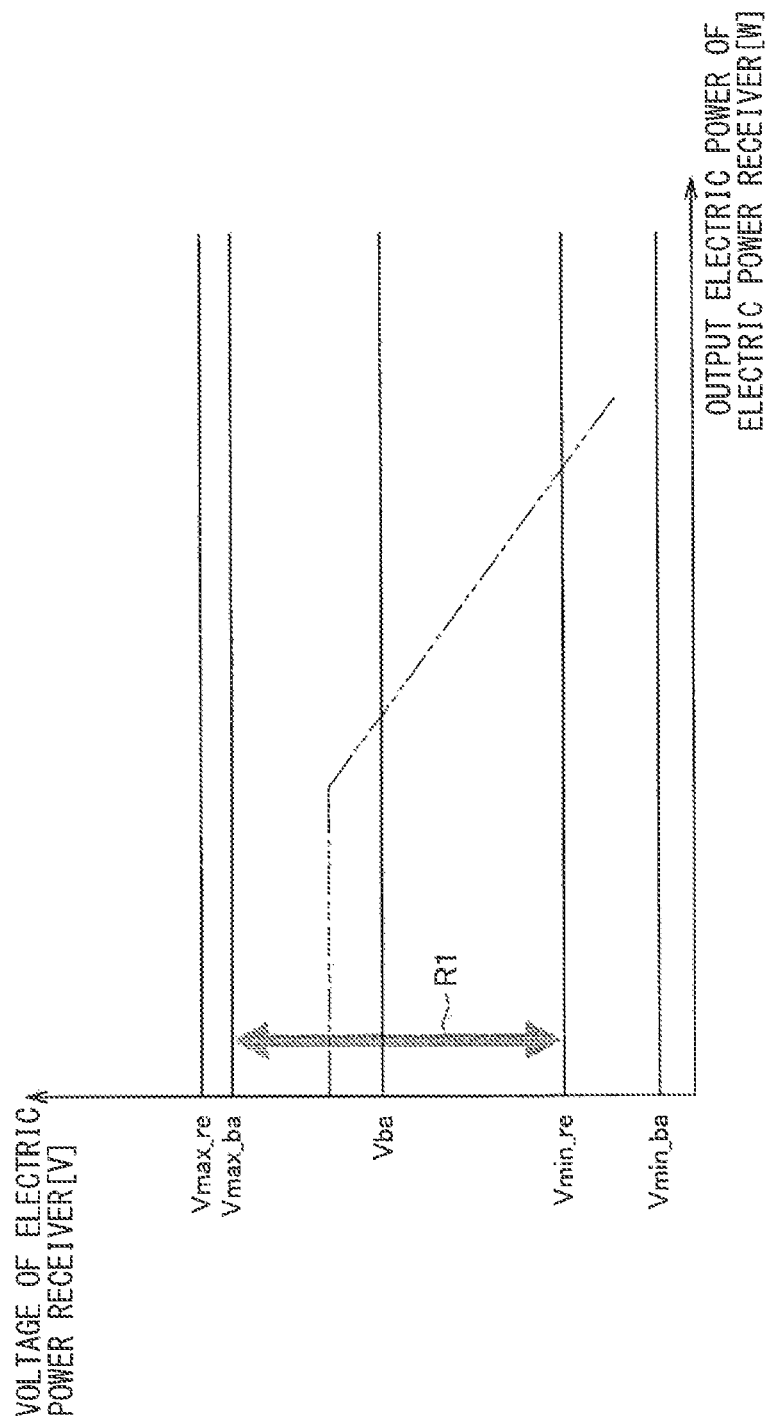
FIG. 5 is a diagram illustrating an example of a reference range that is used to control a voltage of an electric power receiver in the first connection state.

The following description describes, with reference to FIG. 5, the reference range that is used to control the voltage of the electric power receiver 40 in the first connection state. FIG. 5 is a diagram illustrating an example of the reference range.

For example, as illustrated in FIG. 5, the controller 120 may decide, depending on a voltage Vba of the battery 30, an upper limit voltage Vmax_re and a lower limit voltage Vmin_re for the switcher 60 that are directed to suppressing damage to the switcher 60 etc. and an upper limit voltage Vmax_ba and a lower limit voltage Vmin_ba for the battery 30 that are directed to suppressing damage to the battery 30. The controller 120 may decide a reference range R1 by using the upper limit voltage Vmax_re and the lower limit voltage Vmin_re for the switcher 60 and the upper limit voltage Vmax_ba and the lower limit voltage Vmin_ba for the battery 30.

It is to be noted that the controller 120 may decide the reference range by using only the upper limit voltage Vmax_re and the lower limit voltage Vmin_re for the switcher 60, or may decide the reference range by using only the upper limit voltage Vmax_ba and the lower limit voltage Vmin_ba for the battery 30.

If the voltage of the electric power receiver 40 is relatively too high or low with respect to the voltage Vba of the battery 30, the difference between the voltage at point P1 and the voltage at point P2 in FIG. 4 becomes excessively large. Thus, when the electrical connection state of the electric power supply system 1 is set to the second connection state, voltage applied to the switcher 60 etc. can exceed the withstand voltage of the switcher 60 etc. to damage the switcher 60 etc. (e.g., cause welding of the relay). As an upper limit and a lower limit of the voltage of the electric power receiver 40 that are directed to suppressing such damage to the switcher 60 etc., the controller 120 may decide the upper limit voltage Vmax_re and the lower limit voltage Vmin_re for the switcher 60, on the basis of the voltage Vba of the battery 30 and the withstand voltage of the switcher 60 etc.

If the voltage of the electric power receiver 40 is relatively too high with respect to the voltage Vba of the battery 30, the voltage at point P1 in FIG. 4 becomes relatively too large with respect to the voltage at point P2. Thus, when the electrical connection state of the electric power supply system 1 is set to the second connection state, electric power with which the battery 30 is charged can exceed maximum chargeable electric power of the battery 30 (i.e., an amount of electric power with which the battery 30 is chargeable per unit time) to damage the battery 30. If the voltage of the electric power receiver 40 is relatively too low with respect to the voltage Vba of the battery 30, the voltage at point P1 in FIG. 4 becomes relatively too small with respect to the voltage at point P2. Thus, when the electrical connection state of the electric power supply system 1 is set to the second connection state, electric power discharged from the battery 30 can exceed maximum dischargeable electric power of the battery 30 (i.e., an amount of electric power dischargeable from the battery 30 per unit time) to damage the battery 30. As an upper limit and a lower limit of the voltage of the electric power receiver 40 that are directed to suppressing such damage to the battery 30, the controller 120 may decide the upper limit voltage Vmax_ba and the lower limit voltage Vmin_ba for the battery 30, on the basis of the voltage Vba of the battery 30 and the maximum chargeable and dischargeable electric power of the battery 30.

The controller 120 may decide, as an upper limit of the reference range R1, the lower one of the upper limit voltage Vmax_re for the switcher 60 and the upper limit voltage Vmax_ba for the battery 30, and decide, as a lower limit of the reference range R1, the higher one of the lower limit voltage Vmin_re for the switcher 60 and the lower limit voltage Vmin_ba for the battery 30. For example, FIG. 5 illustrates a case where the upper limit voltage Vmax_ba for the battery 30 is lower than the upper limit voltage Vmax_re for the switcher 60, and the lower limit voltage Vmin_re for the switcher 60 is higher than the lower limit voltage Vmin_ba for the battery 30. Therefore, in this case, as illustrated in FIG. 5, the upper limit of the reference range R1 may be the upper limit voltage Vmax_ba for the battery 30, and the lower limit of the reference range R1 may be the lower limit voltage Vmin_re for the switcher 60.

For example, in a case where the output electric power of the electric power receiver 40 is increased with an increase in the electric power consumed by the load 50, the voltage of the electric power receiver 40 decreases, as indicated by a chain double-dashed line in FIG. 5. Therefore, if the voltage of the electric power receiver 40 is not controlled within the reference range R1, a situation may occur in which the voltage of the electric power receiver 40 falls below the lower limit voltage Vmin_re for the switcher 60, as indicated by the chain double-dashed line in FIG. 5. In a case where the electrical connection state of the electric power supply system 1 is set to the second connection state under such a situation, the voltage applied to the switcher 60 etc. can exceed the withstand voltage of the switcher 60 etc. to damage the switcher 60 etc. (e.g., cause welding of the relay).

In contrast, in the electric power supply system 1 according to the example embodiment, when the electrical connection state of the electric power supply system 1 is the first connection state, the controller 120 may control the voltage of the electric power receiver 40 within the reference range R1 corresponding to the voltage of the battery 30. This makes it possible to suppress an excessive increase in voltage difference between the load 50 side and the battery 30 side with respect to the switcher 60, which helps to suppress damage to each apparatus when the electrical connection state of the electric power supply system 1 is set to the second connection state.

The withstand voltage of the switcher 60 etc. changes depending on a change in temperature of the switcher 60 etc. Accordingly, in terms of more appropriately suppressing damage to the switcher 60 etc., the controller 120 may decide the withstand voltage of the switcher 60 etc. on the basis of the temperature of the switcher 60 etc. The maximum chargeable and dischargeable electric power of the battery 30 changes depending on a change in the temperature or the remaining capacity of the battery 30. Accordingly, in terms of more appropriately suppressing damage to the battery 30, the controller 120 may decide the maximum chargeable and dischargeable electric power of the battery 30 on the basis of at least one of the temperature or the remaining capacity of the battery 30.

Figure 6:
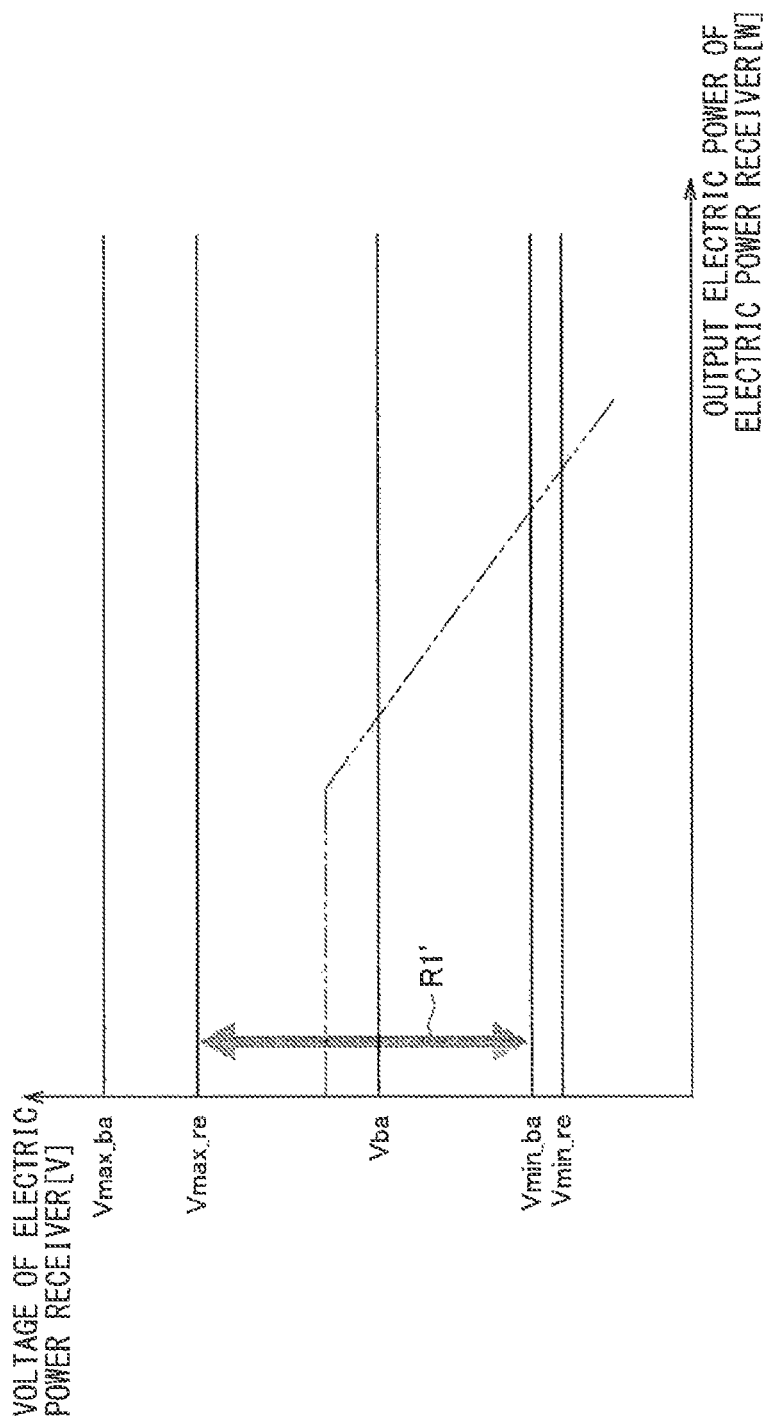
FIG. 6 is a diagram illustrating an example of the reference range that is used to control the voltage of the electric power receiver in the first connection state, the example being different from that in FIG. 5.

As described above, the withstand voltage of the switcher 60 etc. and the maximum chargeable and dischargeable electric power of the battery 30 may be decided by using various parameters. Accordingly, a magnitude relationship between the upper limit voltage Vmax_re for the switcher 60 and the upper limit voltage Vmax_ba for the battery 30 and a magnitude relationship between the lower limit voltage Vmin_re for the switcher 60 and the lower limit voltage Vmin_ba for the battery 30 may change. For example, in a case where the remaining capacity of the battery 30 is small as compared with the example illustrated in FIG. 5, the upper limit voltage Vmax_ba and the lower limit voltage Vmin_ba for the battery 30 become high, as illustrated in FIG. 6. Therefore, as illustrated in FIG. 6, the upper limit voltage Vmax_ba and the lower limit voltage Vmin_ba for the battery 30 become higher than the upper limit voltage Vmax_re and the lower limit voltage Vmin_re for the switcher 60 in some cases. In this case, as illustrated in FIG. 6, an upper limit of a reference range R1' may be the upper limit voltage Vmax_re for the switcher 60, and a lower limit of the reference range R1' may be the lower limit voltage Vmin_ba for the battery 30.

It is to be noted that the controller 120 may adjust the lower limit of the reference range that is used to control the voltage of the electric power receiver 40 in the first connection state, depending on an amount of decrease in the voltage of the electric power receiver 40 in a case where one or more of the loads 50 that are currently undriven (i.e., that can be driven in the future) are driven in the future. For example, the controller 120 may decide, as the lower limit of the reference range that is used to control the voltage of the electric power receiver 40 in the first connection state, a value that is higher, by the above amount of decrease, than the higher one of the lower limit voltage Vmin_re for the switcher 60 and the lower limit voltage Vmin_ba for the battery 30. This makes it possible to appropriately suppress damage to each apparatus (e.g., the switcher 60 etc. and the battery 30) of the electric power supply system 1 if one or more of the loads 50 that are currently undriven are driven in the future.

If the determination result is YES in step S501, in step S504, the controller 120 may set the electrical connection state of the electric power supply system 1 to the second connection state.

Figure 7:
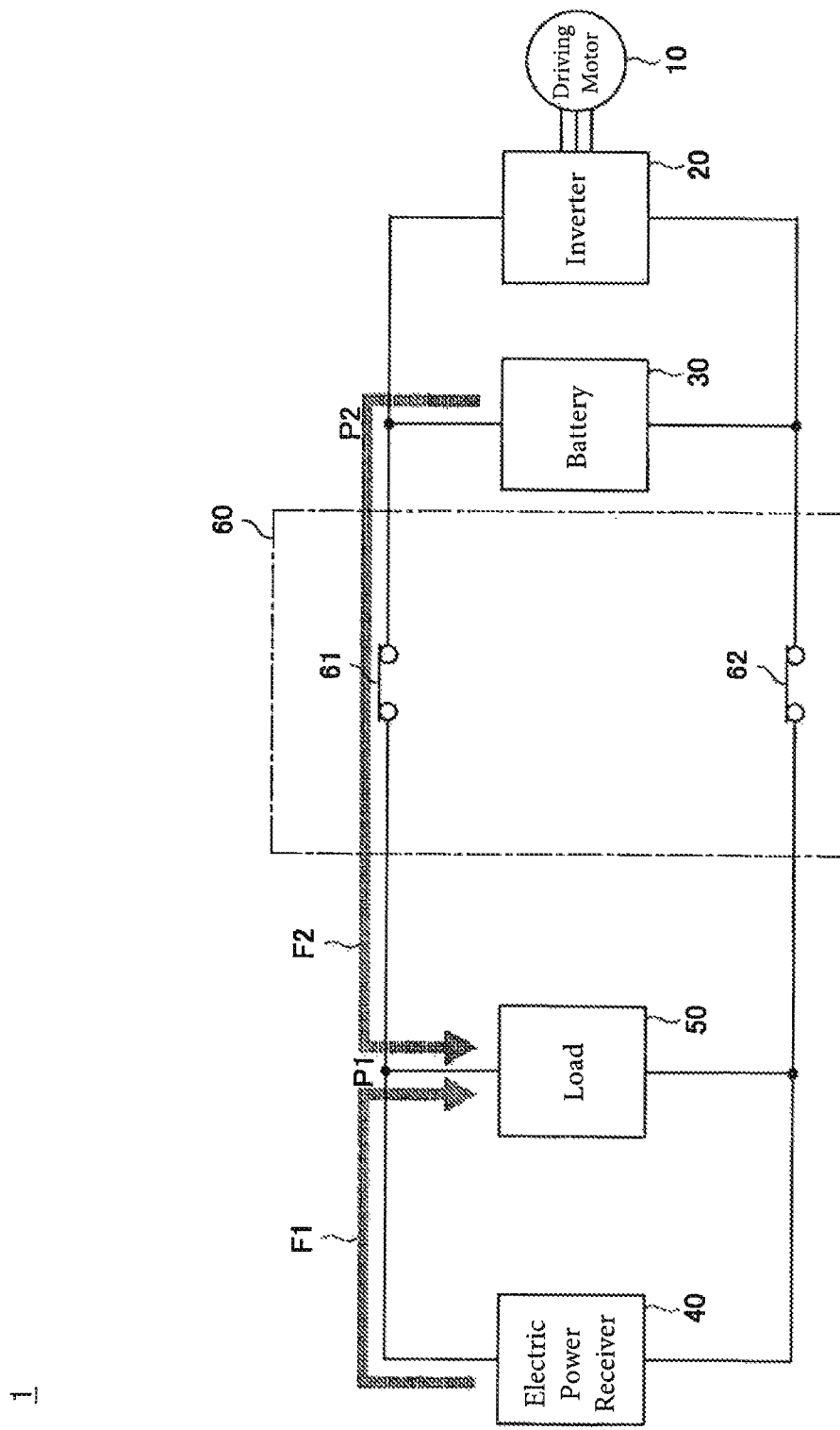
FIG. 7 is a diagram illustrating a second connection state out of the electrical connection states of the electric power supply system according to the example embodiment.

The second connection state will be described with reference to FIG. 7. FIG. 7 is a diagram illustrating the second connection state out of the electrical connection states of the electric power supply system 1. For easier understanding, FIG. 7 does not illustrate the sensors and the control apparatus 100.

As illustrated in FIG. 7, the second connection state may be a connection state in which the electric power receiver 40 and the load 50 are coupled to the battery 30 to allow for electric power supply via the switcher 60. In one example, in the second connection state, the open/closed states of the positive electrode-side relay 61 and the negative electrode-side relay 62 may both be the closed state. Therefore, if it is determined that the output electric power of the electric power receiver 40 is greater than the reference electric power, the controller 120 may close each relay of the switcher 60 (i.e., the positive electrode-side relay 61 and the negative electrode-side relay 62) to set the electrical connection state of the electric power supply system 1 to the second connection state.

In the second connection state, as indicated by arrow F1 in FIG. 7, electric power may be supplied from the electric power receiver 40 to the load 50, as in the first connection state. In the second connection state, the electric power receiver 40 and the load 50 may be coupled to the battery 30 to allow for electric power supply via the switcher 60. Accordingly, as indicated by arrow F2 in FIG. 7, it is possible to supply electric power from the battery 30 to the load 50 via the switcher 60. Here, the output electric power of the electric power receiver 40 being greater than the reference electric power indicates difficulty of covering the electric power consumed by the load 50 by only the output electric power of the electric power receiver 40. Therefore, in such a case, supplying electric power from the battery 30 to the load 50 makes it possible to suppress lack of the electric power supplied to the load 50.

After step S503 or step S504, the control flow illustrated in FIG. 3 may end.

As described above, in the control flow illustrated in FIG. 3, while the output electric power of the electric power receiver 40 increases, it is possible to switch the electrical connection state of the electric power supply system 1 in order of the first connection state and the second connection state. Before setting the electrical connection state of the electric power supply system 1 to the second connection state, a state may be attained in which the electrical connection state of the electric power supply system 1 is the first connection state and the voltage of the electric power receiver 40 is controlled within the reference range corresponding to the voltage of the battery 30. This makes it possible to suppress an excessive increase in voltage difference between the load 50 side and the battery 30 side with respect to the switcher 60. Thus, when the electrical connection state of the electric power supply system 1 is set to the second connection state, it is possible to suppress damage to each apparatus (e.g., the switcher 60 etc. and the battery 30) of the electric power supply system 1.

The above description describes an example in which, in the load driving mode, the electrical connection state of the electric power supply system 1 is switched depending on the output electric power of the electric power receiver 40. However, a trigger other than the output electric power of the electric power receiver 40 may be used to cause the controller 120 to switch the electrical connection state of the electric power supply system 1.

For example, in terms of suppressing wear due to open/close operation of the relays of the switcher 60, after setting the electrical connection state of the electric power supply system 1 to the second connection state in the load driving mode, the controller 120 may keep the electrical connection state of the electric power supply system 1 at the second connection state, regardless of the output electric power of the electric power receiver 40, until a reference time passes. The reference time may be set as appropriate to a value that allows appropriate suppression of excessively frequent execution of the open/close operation of the relays of the switcher 60.

In another example, in terms of suppressing a decrease in the remaining capacity of the battery 30, after setting the electrical connection state of the electric power supply system 1 to the second connection state in the load driving mode, the controller 120 may keep the electrical connection state of the electric power supply system 1 at the second connection state, regardless of the output electric power of the electric power receiver 40, until the remaining capacity of the battery 30 reaches a reference remaining capacity. The reference remaining capacity may be set as appropriate to a value that allows appropriate determination of whether the battery 30 is sufficiently charged.

2-2. Second Example

Now, with reference to FIG. 8, description will be given on the second example of the flow of the process performed by the control apparatus 100.

Figure 8:
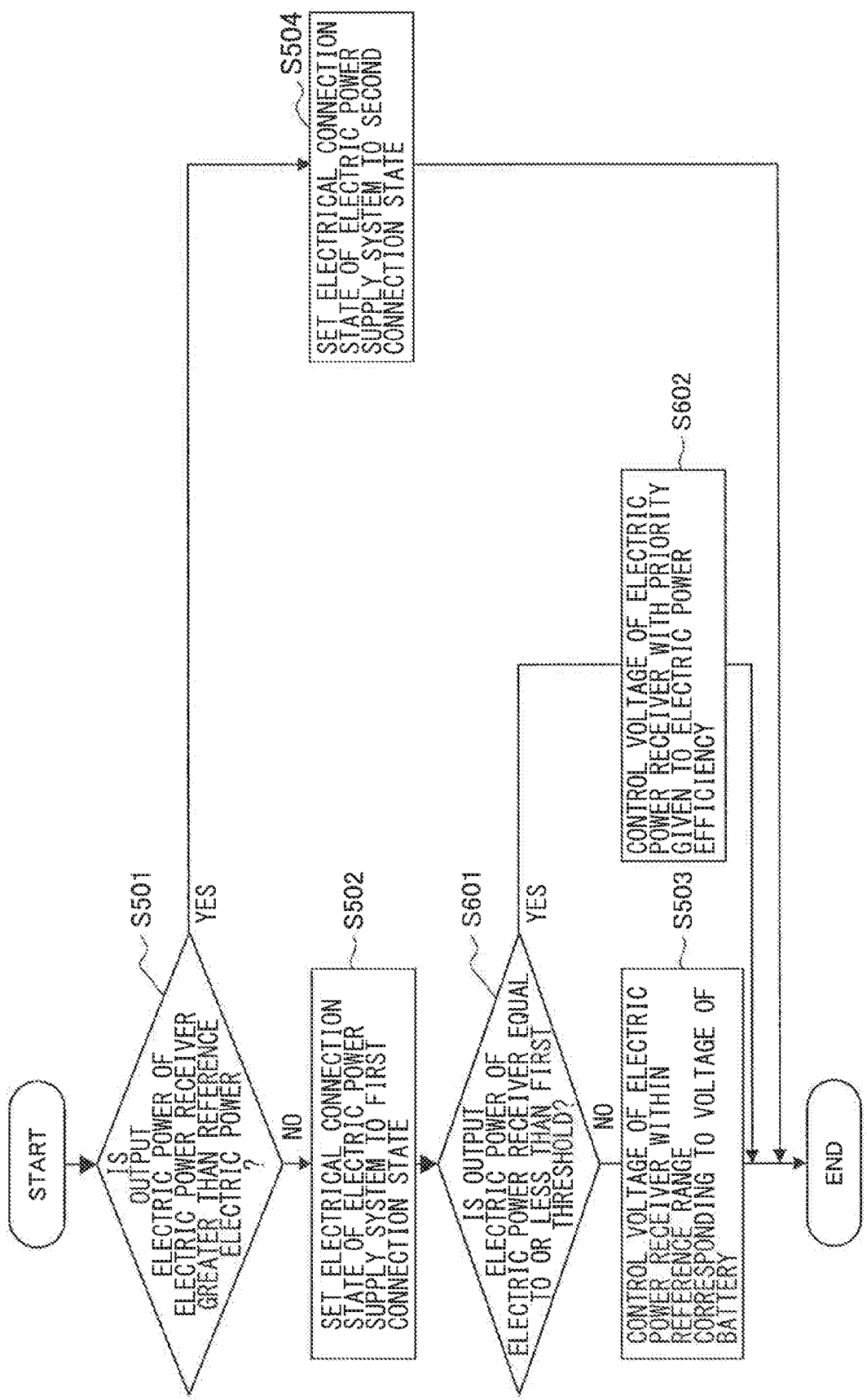
FIG. 8 is a flowchart illustrating a second example of the flow of the process that is performed by the control apparatus according to the example embodiment.

FIG. 8 is a flowchart illustrating the second example of the flow of the process performed by the control apparatus 100. In one example, the control flow illustrated in FIG. 8 may be repeatedly executed by the controller 120 during the execution of the load driving mode, like the control flow illustrated in FIG. 3.

The second example may differ from the above-described first example in that, if it is determined that the output electric power of the electric power receiver 40 is equal to or less than the reference electric power (step S501/NO), a process in step S601 is performed after step S502.

In the control flow according to the second example illustrated in FIG. 8, if the determination result is NO in step S501, in step S502, the controller 120 may set the electrical connection state of the electric power supply system 1 to the first connection state, as in the control flow according to the first example illustrated in FIG. 3. Thereafter, the control flow may proceed to step S601, unlike in the control flow according to the first example illustrated in FIG. 3.

In step S601, the controller 120 may determine whether the output electric power of the electric power receiver 40 is equal to or less than a first threshold that is smaller than the reference electric power. If it is determined that the output electric power of the electric power receiver 40 is equal to or less than the first threshold (step S601/YES), the control flow may proceed to step S602. If it is determined that the output electric power of the electric power receiver 40 is greater than the first threshold (step S601/NO), the control flow may proceed to step S503.

If the determination result is YES in step S601, in step S602, the controller 120 may control the voltage of the electric power receiver 40 with priority given to electric power efficiency.

The controller 120 may control the voltage of the electric power receiver 40 to increase electric power efficiency. Accordingly, the controller 120 may permit the voltage of the electric power receiver 40 to fall outside the reference range used in step S503. This makes it possible to improve electric power efficiency of electric power supply in the electric power supply system 1.

After step S503, step S504, or step S602, the control flow illustrated in FIG. 8 may end.

As described above, in the control flow illustrated in FIG. 8, while the output electric power of the electric power receiver 40 increases, it is possible to switch a state of the electric power supply system 1 in order of a state in which the electrical connection state is the first connection state and the voltage of the electric power receiver 40 is controlled with priority given to electric power efficiency, a state in which the electrical connection state is the first connection state and the voltage of the electric power receiver 40 is controlled within the reference range, and a state in which the electrical connection state is the second connection state. Therefore, in a case where the output electric power of the electric power receiver 40 is equal to or less than the reference electric power and equal to or less than the first threshold, it is possible to improve electric power efficiency of electric power supply in the electric power supply system 1 by controlling the voltage of the electric power receiver 40 with priority given to electric power efficiency.

2-3. Third Example

Now, with reference to FIGS. 9 and 10, description will be given on the third example of the flow of the process performed by the control apparatus 100.

Figure 9:
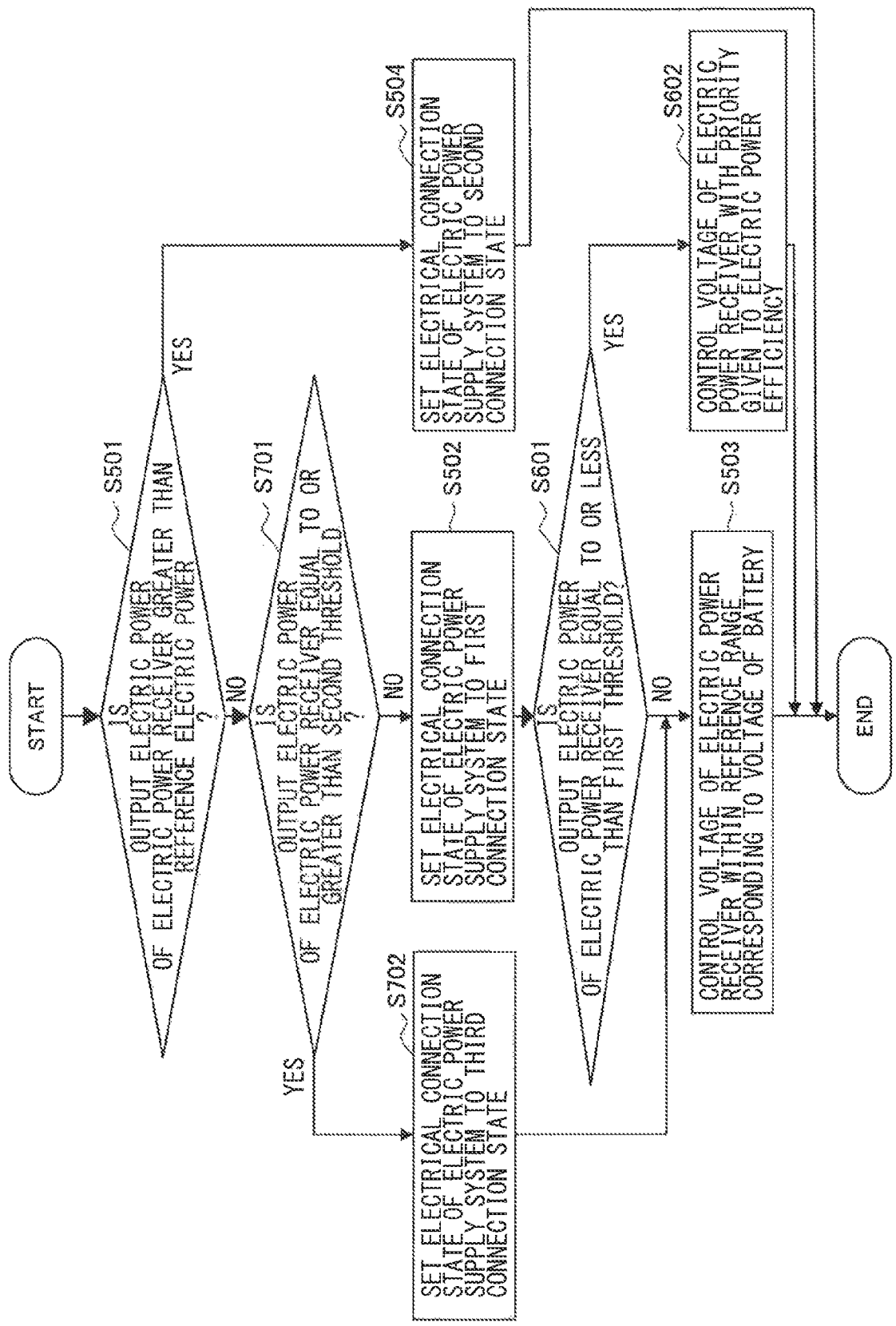
FIG. 9 is a flowchart illustrating a third example of the flow of the process that is performed by the control apparatus according to the example embodiment.

FIG. 9 is a flowchart illustrating the third example of the flow of the process performed by the control apparatus 100. In one example, the control flow illustrated in FIG. 9 may be repeatedly executed by the controller 120 during the execution of the load driving mode, like the control flows illustrated in FIGS. 3 and 8.

The third example may differ from the above-described second example in that, if it is determined that the output electric power of the electric power receiver 40 is equal to or less than the reference electric power (step S501/NO), a process in step S701 is performed.

In the control flow according to the third example illustrated in FIG. 9, if the determination result is YES in step S501, the control flow may proceed to step S504, as in the control flow according to the second example illustrated in FIG. 8. If the determination result is NO in step S501, the control flow may proceed to step S701, unlike in the control flow according to the second example illustrated in FIG. 8.

In step S701, the controller 120 may determine whether the output electric power of the electric power receiver 40 is equal to or greater than a second threshold that is larger than the first threshold. If it is determined that the output electric power of the electric power receiver 40 is less than the second threshold (step S701/NO), the control flow may proceed to step S502. If it is determined that the output electric power of the electric power receiver 40 is equal to or greater than the second threshold (step S701/YES), the control flow may proceed to step S702.

If the determination result is YES in step S701, in step S702, the controller 120 may set the electrical connection state of the electric power supply system 1 to a third connection state.

The third connection state will be described with reference to FIG. 10. FIG. 10 is a diagram illustrating the third connection state out of the electrical connection states of the electric power supply system 1. For easier understanding, FIG. 10 does not illustrate the sensors and the control apparatus 100.

Figure 10:
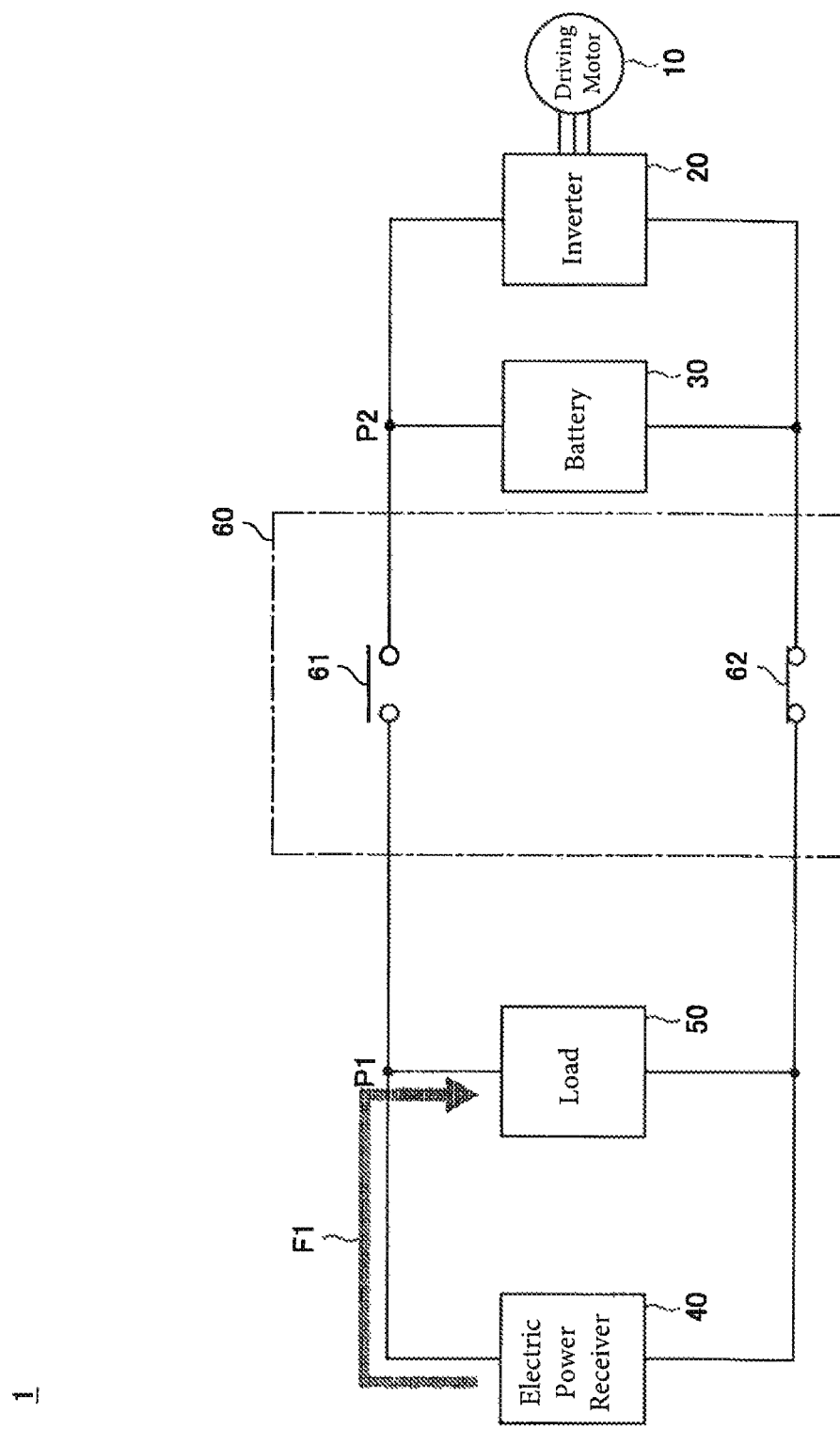
FIG. 10 is a diagram illustrating a third connection state out of the electrical connection states of the electric power supply system according to the example embodiment.

As illustrated in FIG. 10, the third connection state may be a connection state in which one relay out of the positive electrode-side relay 61 and the negative electrode-side relay 62 is open and the other relay is closed. FIG. 10 illustrates an example in which the open/closed states of the positive electrode-side relay 61 and the negative electrode-side relay 62 are respectively the open state and the closed state.

In the third connection state, as indicated by arrow F1 in FIG. 10, electric power may be supplied from the electric power receiver 40 to the load 50, as in the first connection state. In the third connection state, because the one relay out of the positive electrode-side relay 61 and the negative electrode-side relay 62 is open, no electric power supply may occur between the load 50 and the battery 30. This makes it possible to suppress the input and output currents of the battery 30, making it possible to suppress deterioration of the battery 30 due to repetition of charging and discharging of the battery 30, as in the first connection state.

After step S702, the control flow may proceed to step S503, and the controller 120 may control the voltage of the electric power receiver 40 within the reference range corresponding to the voltage of the battery 30.

Thereafter, the control flow illustrated in FIG. 9 may end.

As described above, in the control flow illustrated in FIG. 9, while the output electric power of the electric power receiver 40 increases, it is possible to switch the state of the electric power supply system 1 in order of a state in which the electrical connection state is the first connection state and the voltage of the electric power receiver 40 is controlled with priority given to electric power efficiency, a state in which the electrical connection state is the first connection state and the voltage of the electric power receiver 40 is controlled within the reference range, a state in which the electrical connection state is the third connection state and the voltage of the electric power receiver 40 is controlled within the reference range, and a state in which the electrical connection state is the second connection state. Therefore, it is possible to set the open/closed state of the other relay out of the positive electrode-side relay 61 and the negative electrode-side relay 62 to the closed state, by setting the electrical connection state of the electric power supply system 1 to the third connection state before setting it to the second connection state. This makes it possible to set the electrical connection state of the electric power supply system 1 to the second connection state by closing only the one relay out of the positive electrode-side relay 61 and the negative electrode-side relay 62. This helps to quickly switch the electrical connection state of the electric power supply system 1.

In terms of suppressing wear due to the open/close operation of the relays of the switcher 60, when switching the electrical connection state of the electric power supply system 1 to the third connection state from another connection state different from the third connection state, the controller 120 may close the relay that was open in the previous third connection state, and open the relay that was closed. For example, in a case where the positive electrode-side relay 61 is open and the negative electrode-side relay 62 is closed as illustrated in FIG. 10 in the previous third connection state, when switching the electrical connection state of the electric power supply system 1 to the third connection state from another connection state different from the third connection state, the controller 120 may close the positive electrode-side relay 61 and open the negative electrode-side relay 62. When switching next time to the third connection state from another connection state different from the third connection state, the controller 120 may open the positive electrode-side relay 61 and close the negative electrode-side relay 62.

3. Example Effects of Electric Power Supply System

Now, example effects of the electric power supply system 1 according to the example embodiment of the technology will be described.

In the electric power supply system 1 according to the example embodiment, in a state in which the electric power receiver 40 is able to receive electric power, the controller 120 is able to execute the load driving mode of permitting driving of the load 50 that is coupled to the battery 30 in parallel with the electric power receiver 40. The switcher 60 that allows or cuts off electrical connection of the electric power receiver 40 and the load 50 to the battery 30 may be provided between the battery 30, and the electric power receiver 40 and the load 50. In the load driving mode, while it is determined that the output electric power of the electric power receiver 40 is equal to or less than the reference electric power, the controller 120 may set the electrical connection state of the electric power supply system 1 to the first connection state in which the electric power receiver 40 and the load 50 are electrically cut off from the battery 30 by the switcher 60, and thereafter may control the voltage of the electric power receiver 40 within the reference range corresponding to the voltage of the battery 30. In the load driving mode, if it is determined that the output electric power of the electric power receiver 40 is greater than the reference electric power, the controller 120 may set the electrical connection state of the electric power supply system 1 to the second connection state in which the electric power receiver 40 and the load 50 are electrically coupled to the battery 30 via the switcher 60.

Thus, in a case where it is possible to cover the electric power consumed by the load 50 by only the output electric power of the electric power receiver 40, it is possible to suppress the input and output currents of the battery 30 by setting the electrical connection state of the electric power supply system 1 to the first connection state. This makes it possible to suppress deterioration of the battery 30 due to repetition of charging and discharging of the battery 30. In a case where it is difficult to cover the electric power consumed by the load 50 by only the output electric power of the electric power receiver 40, it is possible to suppress lack of the electric power supplied to the load 50 by setting the electrical connection state of the electric power supply system 1 to the second connection state. Furthermore, in the first connection state, it is possible to suppress an excessive increase in voltage difference between the load 50 side and the battery 30 side with respect to the switcher 60. Thus, when the electrical connection state of the electric power supply system 1 is set to the second connection state, it is possible to suppress damage to each apparatus (e.g., the switcher 60 etc. and the battery 30) of the electric power supply system 1. This makes it possible to appropriately suppress deterioration of the battery 30.

In the electric power supply system 1 according to the example embodiment, the controller 120 may decide the reference range on the basis of the withstand voltage of the switcher 60 and the electric power line coupled to the switcher 60. Thus, when the electrical connection state of the electric power supply system 1 is set to the second connection state, it is possible to suppress excess of the voltage applied to the switcher 60 and the electric power line coupled to the switcher 60 over the withstand voltage of the switcher 60 and the electric power line coupled to the switcher 60. This makes it possible to appropriately suppress damage to the switcher 60 and the electric power line coupled to the switcher 60.

In the electric power supply system 1 according to the example embodiment, the controller 120 may decide the withstand voltage of the switcher 60 and the electric power line coupled to the switcher 60, on the basis of the temperature of the switcher 60 and the electric power line coupled to the switcher 60. This makes it possible to appropriately decide the withstand voltage of the switcher 60 and the electric power line coupled to the switcher 60, depending on a change in the temperature of the switcher 60 and the electric power line coupled to the switcher 60. This helps to appropriately suppress damage to the switcher 60 and the electric power line coupled to the switcher 60.

In the electric power supply system 1 according to the example embodiment, the controller 120 may decide the reference range on the basis of the maximum chargeable and dischargeable electric power of the battery 30. Thus, when the electrical connection state of the electric power supply system 1 is set to the second connection state, it is possible to suppress excess of the electric power with which the battery 30 is charged over the maximum chargeable electric power of the battery 30 and excess of the electric power discharged from the battery 30 over the maximum dischargeable electric power of the battery 30. This makes it possible to appropriately suppress damage to the battery 30.

In the electric power supply system 1 according to the example embodiment, the controller 120 may decide the maximum chargeable and dischargeable electric power of the battery 30, on the basis of the temperature of the battery 30. This makes it possible to appropriately decide the maximum chargeable and dischargeable electric power of the battery 30, depending on a change in the temperature of the battery 30. This helps to more appropriately suppress damage to the battery 30.

In the electric power supply system 1 according to the example embodiment, the controller 120 may decide the maximum chargeable and dischargeable electric power of the battery 30, on the basis of the remaining capacity of the battery 30. This makes it possible to appropriately decide the maximum chargeable and dischargeable electric power of the battery 30, depending on a change in the remaining capacity of the battery 30. This helps to more appropriately suppress damage to the battery 30.

In the electric power supply system 1 according to the example embodiment, after setting the electrical connection state of the electric power supply system 1 to the second connection state in the load driving mode, the controller 120 may keep the electrical connection state of the electric power supply system 1 at the second connection state, regardless of the output electric power of the electric power receiver 40, until the reference time passes. This makes it possible to suppress excessively frequent execution of the open/close operation of the relays of the switcher 60 caused by the electrical connection state of the electric power supply system 1 being excessively frequently switched between the first connection state and the second connection state. This helps to suppress wear due to the open/close operation of the relays of the switcher 60.

In the electric power supply system 1 according to the example embodiment, after setting the electrical connection state of the electric power supply system 1 to the second connection state in the load driving mode, the controller 120 may keep the electrical connection state of the electric power supply system 1 at the second connection state, regardless of the output electric power of the electric power receiver 40, until the remaining capacity of the battery 30 reaches the reference remaining capacity. Thus, in the second connection state, it is possible to appropriately recover the remaining capacity of the battery 30 that has decreased due to electric power supply from the battery 30 to the load 50. In other words, it is possible to suppress a decrease in the remaining capacity of the battery 30.

In the electric power supply system 1 according to the example embodiment, in the load driving mode, if it is determined that the output electric power of the electric power receiver 40 is equal to or less than the first threshold that is smaller than the reference electric power, the controller 120 may control the voltage of the electric power receiver 40 with priority given to electric power efficiency. Thus, in a case where the output electric power of the electric power receiver 40 is equal to or less than the reference electric power and equal to or less than the first threshold, it is possible to improve electric power efficiency of electric power supply in the electric power supply system 1 by controlling the voltage of the electric power receiver 40 with priority given to electric power efficiency.

In the electric power supply system 1 according to the example embodiment, in the load driving mode, if it is determined that the output electric power of the electric power receiver 40 is equal to or less than the reference electric power and equal to or greater than the second threshold that is larger than the first threshold, the controller 120 may set the electrical connection state of the electric power supply system 1 to the third connection state in which one relay out of the positive electrode-side relay 61 and the negative electrode-side relay 62 is open and the other relay is closed, and thereafter may control the voltage of the electric power receiver 40 within the reference range corresponding to the voltage of the battery 30. Thus, it is possible to set the open/closed state of the other relay out of the positive electrode-side relay 61 and the negative electrode-side relay 62 to the closed state, by setting the electrical connection state of the electric power supply system 1 to the third connection state before setting it to the second connection state. This makes it possible to set the electrical connection state of the electric power supply system 1 to the second connection state by closing only the one relay out of the positive electrode-side relay 61 and the negative electrode-side relay 62. This helps to quickly switch the electrical connection state of the electric power supply system 1.

In the electric power supply system 1 according to the example embodiment, when switching the electrical connection state of the electric power supply system 1 to the third connection state from another connection state different from the third connection state, the controller 120 may close the relay that was open in the previous third connection state, and open the relay that was closed. Thus, in opening and closing of the relays of the switcher 60 accompanying switching of the electrical connection state of the electric power supply system 1, it is possible to suppress excessively frequent execution of the open/close operation of one relay of the switcher 60 as compared with the open/close operation of the other relay. This helps to suppress wear due to the open/close operation of the relays of the switcher 60.

4. Conclusion

As described above, in the example embodiment, it is possible to appropriately suppress deterioration of the battery. For example, in the electric power supply system 1 according to the example embodiment, the load driving mode may be permitted in a state in which the electric power receiver 40 is able to receive electric power. In the load driving mode, while it is determined that the output electric power of the electric power receiver 40 is equal to or less than the reference electric power, the controller 120 may set the electrical connection state of the electric power supply system 1 to the first connection state in which connection of the electric power receiver 40 and the load 50 to the battery 30 is electrically cut off by the switcher 60, and may control the voltage of the electric power receiver 40 depending on the voltage of the battery 30. If it is determined that the output electric power of the electric power receiver 40 is greater than the reference electric power, the controller 120 may set the electrical connection state of the electric power supply system 1 to the second connection state in which the electric power receiver 40 and the load 50 are electrically coupled to the battery 30 via the switcher 60.

Thus, in a case where it is possible to cover the electric power consumed by the load 50 by only the output electric power of the electric power receiver 40, it is possible to suppress deterioration of the battery 30 by setting the electrical connection state of the electric power supply system 1 to the first connection state. In a case where it is difficult to cover the electric power consumed by the load 50 by only the output electric power of the electric power receiver 40, it is possible to suppress lack of the electric power supplied to the load 50 by setting the electrical connection state of the electric power supply system 1 to the second connection state. Furthermore, when the electrical connection state of the electric power supply system 1 is set to the second connection state, it is possible to suppress damage to each apparatus of the electric power supply system 1. This makes it possible to appropriately suppress deterioration of the battery 30.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the above description describes the electric power supply system 1 with reference to FIG. 1, but the electric power supply system 1 illustrated in FIG. 1 is merely an example of an electric power supply system according to any embodiment of the technology. An electric power supply system according to any embodiment of the technology may be the electric power supply system 1 in FIG. 1 modified in a variety of ways as appropriate. Examples of such modification may include addition, deletion, and change of elements.

For example, for easier understanding, FIG. 1 does not illustrate an element interposed between the inverter 20 and the battery 30. However, an inverter switcher that allows or cuts off electrical connection between the inverter 20 and the battery 30 may be provided between the inverter 20 and the battery 30. It is to be noted that FIG. 1 illustrates the inverter 20 and the driving motor 10 provided on the battery 30 side with respect to the switcher 60, but the inverter 20 and the driving motor 10 may be provided on the load 50 side with respect to the switcher 60. In that case, it is possible for the switcher 60 to allow or cut off electrical connection between the inverter 20 and the battery 30. This may eliminate the need for providing the above inverter switcher separately from the switcher 60, making it possible to reduce cost.

In addition, the processes described with reference to the flowcharts in this specification do not necessarily have to be executed in the order illustrated in the flowcharts. Furthermore, additional processing steps may be adopted, or some processing steps may be omitted.

The control apparatus 100 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the control apparatus 100 illustrated in FIG. 2.

The invention claimed is:

1. An electric power supply system comprising:
 a battery;
 an electric power receiving apparatus coupled to the battery in parallel with a load, and configured to receive external electric power and supply the external electric power to the battery;
 a switching apparatus configured to allow or cut off connection of the electric power receiving apparatus and the load to the battery; and
 a control apparatus configured to permit a load driving mode of driving the load and control the switching apparatus in a case where the electric power receiving apparatus is able to receive the external electric power, the control apparatus being configured to, in the load driving mode:
  if output electric power of the electric power receiving apparatus is equal to or less than reference electric power, set an electrical connection state of the electric power supply system to a first connection state in which the connection of the electric power receiving apparatus and the load to the battery is cut off by the switching apparatus, and control a voltage of the electric power receiving apparatus depending on a voltage of the battery; and
  if the output electric power of the electric power receiving apparatus is greater than the reference electric power, set the electrical connection state of the electric power supply system to a second connection state in which the electric power receiving apparatus and the load are coupled to the battery via the switching apparatus.

2. The electric power supply system according to claim 1, wherein the control apparatus is further configured to, if the output electric power of the electric power receiving apparatus is equal to or less than the reference electric power, control the voltage of the electric power receiving apparatus within a reference range corresponding to the voltage of the battery, and decide the reference range on a basis of a withstand voltage of the switching apparatus and an electric power line coupled to the switching apparatus.

3. The electric power supply system according to claim 2, wherein the control apparatus is further configured to decide the withstand voltage on a basis of a temperature of the switching apparatus and the electric power line.

4. The electric power supply system according to claim 2, wherein the control apparatus is further configured to, if the output electric power of the electric power receiving apparatus is equal to or less than the reference electric power, control the voltage of the electric power receiving apparatus within a reference range corresponding to the voltage of the battery, and decide the reference range on a basis of maximum chargeable and dischargeable electric power of the battery.

5. The electric power supply system according to claim 4, wherein the control apparatus is further configured to decide the maximum chargeable and dischargeable electric power on a basis of a temperature of the battery.

6. The electric power supply system according to claim 2, wherein the control apparatus is further configured to, in the load driving mode, keep the electrical connection state of the electric power supply system at the second connection state, regardless of the output electric power of the electric power receiving apparatus, until a reference time passes after setting the electrical connection state of the electric power supply system to the second connection state.

7. The electric power supply system according to claim 2, wherein the control apparatus is further configured to, in the load driving mode, keep the electrical connection state of the electric power supply system at the second connection state, regardless of the output electric power of the electric power receiving apparatus, until a remaining capacity of the battery reaches a reference remaining capacity after setting the electrical connection state of the electric power supply system to the second connection state.

8. The electric power supply system according to claim 2, wherein the control apparatus is further configured to, in the load driving mode, control the voltage of the electric power receiving apparatus with priority given to electric power efficiency if the output electric power of the electric power receiving apparatus is equal to or less than a first threshold that is smaller than the reference electric power.

9. The electric power supply system according to claim 8, wherein
 the switching apparatus includes a positive electrode-side relay coupled to a positive electrode side of the battery and a negative electrode-side relay coupled to a negative electrode side of the battery, and
 the control apparatus is further configured to, in the load driving mode, set the electrical connection state of the electric power supply system to a third connection state in which one of the positive electrode-side relay and the negative electrode-side relay is open and the other of the positive electrode-side relay and the negative electrode-side relay is closed, and control the voltage of the electric power receiving apparatus depending on the voltage of the battery, if the output electric power of the electric power receiving apparatus is equal to or less than the reference electric power and equal to or greater than a second threshold that is larger than the first threshold.

10. The electric power supply system according to claim 9, wherein the control apparatus is further configured to, in a case of switching the electrical connection state of the electric power supply system to the third connection state from a connection state other than the third connection state, close one of the positive electrode-side relay and the negative electrode-side relay that has been opened when the electrical connection state of the electric power supply system has been previously set to the third connection state, and open the other of the positive electrode-side relay and the negative electrode-side relay that has been closed when the electrical connection state of the electric power supply system has been previously set to the third connection state.

11. The electric power supply system according to claim 1, wherein the control apparatus is further configured to, if the output electric power of the electric power receiving apparatus is equal to or less than the reference electric power, control the voltage of the electric power receiving apparatus within a reference range corresponding to the voltage of the battery, and decide the reference range on a basis of maximum chargeable and dischargeable electric power of the battery.

12. The electric power supply system according to claim 11, wherein the control apparatus is further configured to decide the maximum chargeable and dischargeable electric power on a basis of a temperature of the battery.

13. The electric power supply system according to claim 12, wherein the control apparatus is further configured to decide the maximum chargeable and dischargeable electric power on a basis of a remaining capacity of the battery.

14. The electric power supply system according to claim 11, wherein the control apparatus is further configured to decide the maximum chargeable and dischargeable electric power on a basis of a remaining capacity of the battery.

15. The electric power supply system according to claim 1, wherein the control apparatus is further configured to, in the load driving mode, keep the electrical connection state of the electric power supply system at the second connection state, regardless of the output electric power of the electric power receiving apparatus, until a reference time passes after setting the electrical connection state of the electric power supply system to the second connection state.

16. The electric power supply system according to claim 1, wherein the control apparatus is further configured to, in the load driving mode, keep the electrical connection state of the electric power supply system at the second connection state, regardless of the output electric power of the electric power receiving apparatus, until a remaining capacity of the battery reaches a reference remaining capacity after setting the electrical connection state of the electric power supply system to the second connection state.

17. The electric power supply system according to claim 1, wherein the control apparatus is further configured to, in the load driving mode, control the voltage of the electric power receiving apparatus with priority given to electric power efficiency if the output electric power of the electric power receiving apparatus is equal to or less than a first threshold that is smaller than the reference electric power.

18. The electric power supply system according to claim 17, wherein
the switching apparatus includes a positive electrode-side relay coupled to a positive electrode side of the battery and a negative electrode-side relay coupled to a negative electrode side of the battery, and the control apparatus is further configured to, in the load driving mode, set the electrical connection state of the electric power supply system to a third connection state in which one of the positive electrode-side relay and the negative electrode-side relay is open and the other of the positive electrode-side relay and the negative electrode-side relay is closed, and control the voltage of the electric power receiving apparatus depending on the voltage of the battery, if the output electric power of the electric power receiving apparatus is equal to or less than the reference electric power and equal to or greater than a second threshold that is larger than the first threshold.

19. The electric power supply system according to claim 18, wherein the control apparatus is further configured to, in a case of switching the electrical connection state of the electric power supply system to the third connection state from a connection state other than the third connection state, close one of the positive electrode-side relay and the negative electrode-side relay that has been opened when the electrical connection state of the electric power supply system has been previously set to the third connection state, and open the other of the positive electrode-side relay and the negative electrode-side relay that has been closed when the electrical connection state of the electric power supply system has been previously set to the third connection state.

20. An electric power supply system comprising:
a battery;
an electric power receiving apparatus coupled to the battery in parallel with a load, and configured to receive external electric power and supply the external electric power to the battery;
a switching apparatus configured to allow or cut off connection of the electric power receiving apparatus and the load to the battery; and
a control apparatus configured to permit a load driving mode of driving the load and control the switching apparatus in a case where the electric power receiving apparatus receives the external electric power, the control apparatus being configured to, while output electric power of the electric power receiving apparatus increases in the load driving mode, set in order an electrical connection state of the electric power supply system to a first connection state in which connection of the electric power receiving apparatus and the load to the battery is cut off by the switching apparatus, and then to a second connection state in which the electric power receiving apparatus and the load are coupled to the battery via the switching apparatus.

21. The electric power supply system according to claim 20, wherein before setting the electrical connection state of the electric power supply system to the second connection state, the electrical connection state of the electric power supply system is in the first connection state and a voltage of the electric power receiver is controlled within a reference range corresponding to a voltage of the battery.

22. The electric power supply system according to claim 20, wherein while the output electric power of the electric power receiver increases in the load driving mode where the electric power receiving apparatus receives the external electric power, the control apparatus actively switches the electrical connection state of the electric power supply system in the order of the first connection state and then to the second connection state.

* * * * *